United States Patent
De Villele et al.

(10) Patent No.: US 11,721,223 B2
(45) Date of Patent: Aug. 8, 2023

(54) METHOD AND SYSTEM FOR ENGAGING A VERTICAL NAVIGATION DESCENT MODE FOR AN AIRCRAFT

(71) Applicant: HONEYWELL INTERNATIONAL INC., Morris Plains, NJ (US)

(72) Inventors: Dorothee De Villele, Montjoire (FR); Rajesh Chaubey, Bangalore (IN); John Hillier, Phoenix, AZ (US); Daniel E. Lewis, Glendale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/193,522

(22) Filed: Nov. 16, 2018

(65) Prior Publication Data

US 2020/0160731 A1 May 21, 2020

(51) Int. Cl.
*G08G 5/00* (2006.01)
*G05D 1/06* (2006.01)

(52) U.S. Cl.
CPC ......... *G08G 5/0047* (2013.01); *G08G 5/0013* (2013.01); *G08G 5/0021* (2013.01); *G08G 5/0039* (2013.01); *G05D 1/0676* (2013.01)

(58) Field of Classification Search
CPC .. G08G 5/0047; G08G 5/0013; G08G 5/0021; G08G 5/0039; G05D 1/0676
See application file for complete search history.

(56) References Cited

U.S. PATENT DOCUMENTS

| | | | |
|---|---|---|---|
| 7,693,620 B2 | 4/2010 | Dubeck et al. | |
| 8,412,392 B2* | 4/2013 | Jayathirtha | G05D 1/0005 701/14 |
| 8,494,766 B2 | 7/2013 | Walter | |
| 9,116,524 B1 | 8/2015 | Barker et al. | |
| 9,132,913 B1* | 9/2015 | Shapiro | G05D 1/106 |
| 9,224,302 B1 | 12/2015 | Young et al. | |
| 9,423,799 B1* | 8/2016 | Wu | G05D 1/042 |
| 2006/0271250 A1 | 11/2006 | Dubeck et al. | |
| 2008/0140270 A1* | 6/2008 | Davis | G08G 5/0021 701/8 |
| 2010/0030401 A1* | 2/2010 | Rogers | G08G 5/0013 701/3 |

(Continued)

FOREIGN PATENT DOCUMENTS

| | | |
|---|---|---|
| EP | 2474812 A2 | 7/2012 |
| EP | 3208787 A2 | 8/2017 |
| EP | 3306593 A1 | 4/2018 |

*Primary Examiner* — Nadeem Odeh
(74) *Attorney, Agent, or Firm* — Lorenz & Kopf LLP

(57) ABSTRACT

Methods and systems are provided for engaging a vertical navigational descent (VNAV/DES) mode of a flight management system (FMS) for an aircraft. The method comprises retrieving a preset vertical navigation (VNAV) profile for a descent path of the aircraft that is stored in the FMS. The current flight path angle (FPA) and vertical speed (VS) of the aircraft is determined and intercept parameters are calculated to intercept the preset VNAV profile with the VNAV/DES mode of the FMS. The intercept parameters are calculated based on the current FPA and VS and displayed to an aircrew member of the aircraft on a visual display device. The aircrew member is allowed to accept the intercept parameters with the VNAV/DES mode of the FMS.

17 Claims, 10 Drawing Sheets

(56) References Cited

U.S. PATENT DOCUMENTS

| | | | |
|---|---|---|---|
| 2012/0083946 A1* | 4/2012 | Maldonado | G06Q 10/06 701/3 |
| 2015/0019047 A1 | 1/2015 | Chandrashekarappa et al. | |
| 2015/0120100 A1* | 4/2015 | Sacle | G01C 23/00 701/18 |
| 2015/0348423 A1* | 12/2015 | Chaubey | G05D 1/0005 701/18 |
| 2015/0378358 A1* | 12/2015 | Gutierrez-Castaneda | G05D 1/0607 701/8 |
| 2016/0103579 A1* | 4/2016 | Coulmeau | G06F 3/0488 701/533 |
| 2017/0162067 A1* | 6/2017 | Rouquette | G05D 1/0676 |
| 2017/0323573 A1* | 11/2017 | Decker | G08G 5/0034 |
| 2018/0276999 A1 | 9/2018 | Dacre-Wright et al. | |
| 2019/0005827 A1* | 1/2019 | Bauer | G05D 1/0676 |

\* cited by examiner

METHOD AND SYSTEM FOR ENGAGING A VERTICAL NAVIGATION DESCENT MODE FOR AN AIRCRAFT

TECHNICAL FIELD

The present invention generally relates to aircraft operations, and more particularly relates to a method and system for engaging a vertical navigation descent mode for an aircraft.

BACKGROUND

During flight operations, a descent profile is used to plan an aircraft's descent angle and speed in order to reach its target destination for a landing. While the descent profile is preplanned, it is common for an aircraft to require adjustments to meet the profile especially when using manual control. Hence there is a need for a method and system for controlling an aircraft along a vertical navigation path.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for engaging a vertical navigational descent (VNAV/DES) mode of a flight management system (FMS) for an aircraft. The method comprises: retrieving a preset vertical navigation (VNAV) profile for a descent path of the aircraft, where the VNAV profile is stored in the FMS; determining the current flight path angle (FPA) and vertical speed (VS) of the aircraft; calculating intercept parameters for the aircraft to intercept the preset VNAV profile with the VNAV/DES mode of the FMS, where the intercept parameters are calculated based on the current FPA and VS; displaying the intercept parameters to an aircrew member of the aircraft on a visual display device; and allowing the aircrew member to accept the intercept parameters for the aircraft to intercept the preset VNAV profile with the VNAV/DES mode of the FMS.

A system is provided for engaging a vertical navigational descent (VNAV/DES) mode for an aircraft. The system comprises: a retrievable electronic memory located onboard the aircraft, where the electronic memory stores a preset vertical navigation (VNAV) profile for a descent path of the aircraft; and a flight management system (FMS) on board the aircraft, where the FMS, activates a vertical navigational descent (VNAV/DES) mode, retrieves a preset vertical navigation (VNAV) profile for a descent path of the aircraft stored in the retrievable electronic memory, determines the current flight path angle (FPA) and vertical speed (VS) of the aircraft, calculates intercept parameters for the aircraft to intercept the preset VNAV profile with the VNAV/DES mode of the FMS, where the intercept parameters are calculated based on the current FPA and VS, displays the intercept parameters to an aircrew member of the aircraft on a visual display device, and allows the aircrew member to accept the intercept parameters for the aircraft to intercept the preset VNAV profile with the VNAV/DES mode of the FMS.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A method and system for controlling an aircraft along a vertical navigation path has been developed. More specifically, the method and system engage a vertical navigation descent (VNAV/DES) mode of a flight management system (FMS) for an aircraft. The method retrieves a preset vertical navigation (VNAV) profile for a descent path for the aircraft that is computed by and stored in the FMS. The FMS determines the current flight path angle (FPA) and vertical speed (VS) of the aircraft. The FMS uses these current values to calculate intercept parameters for the aircraft to intercept the preset VNAV profile. The intercept parameters are displayed to the aircrew on a visual display device that allows the aircrew to accept the parameters in order to intercept the preset VNAV profile.

As used herein, charts may be any aviation chart or aeronautical chart provided as an informational aid to a flight crew for flight planning purposes. Chart data is any data provided by an electronic chart or a data driven chart (DDC). Aircraft generally use electronic charts for providing a flight crew member with information specific to a particular route and/or airport. Electronic charts may include airport maps; intersections and taxiways data; procedures and data associated with approach, arrival, and departure; and any flight constraints associated with a current flight plan. A flight plan is a proposed strategy for an intended flight, includes details associated with the intended flight, and is usually filed with an aviation authority (e.g., Federal Aviation Administration). An intended flight may also be referred to as a "trip" and extends from a departure airport at the beginning point of the trip to a destination airport at the endpoint of the trip. An alert may be any signal or warning indicating potential non-compliance with constraints associated with the current flight plan. The alert may be implemented as a display of text and/or graphical elements, a sound, a light, or other visual or auditory warning signal onboard the aircraft.

Figure 1:
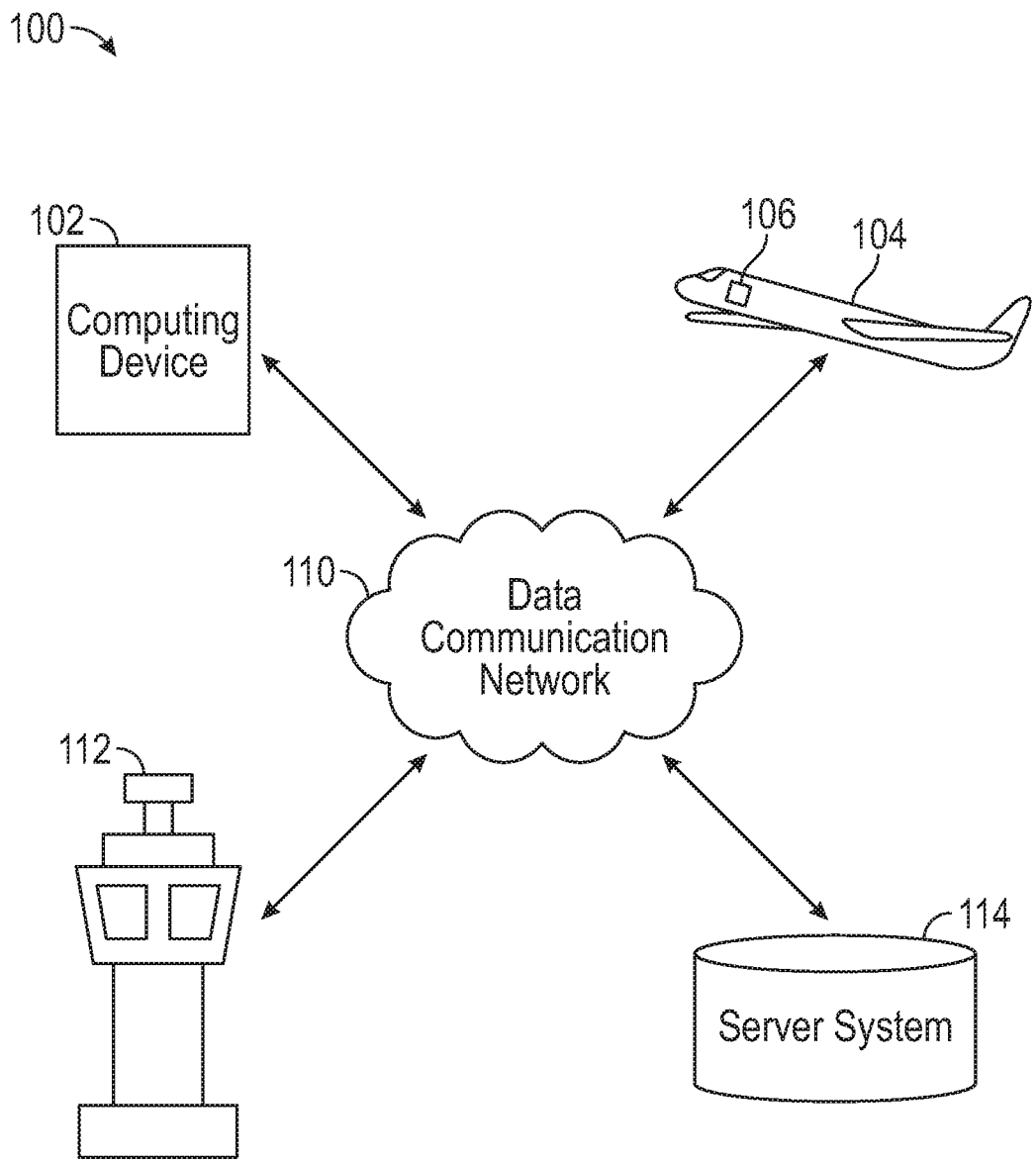
FIG. 1 shows a diagram of a system for engaging a VNAV/DES mode for an aircraft in accordance with one embodiment.

Turning now to the figures, FIG. 1 is a diagram of a system 100 for engaging a VNAV/DES mode for an aircraft, in accordance with the disclosed embodiments. The system 100 operates with a current flight of the aircraft 104, to continuously monitor flight data and parameters during flight. The system 100 may include, without limitation, a computing device 102 that communicates with one or more avionics systems 106 onboard the aircraft 104, at least one server system 114, and air traffic control (ATC) 112, via a data communication network 110. In practice, certain embodiments of the system 100 may include additional or alternative elements and components, as desired for the particular application.

The computing device 102 may be implemented by any computing device that includes at least one processor, some form of memory hardware, a user interface, and communication hardware. For example, the computing device 102 may be implemented using a personal computing device, such as a tablet computer, a laptop computer, a personal digital assistant (PDA), a smartphone, or the like. In this scenario, the computing device 102 is capable of storing, maintaining, and executing an Electronic Flight Bag (EFB) application configured to determine and present emergency alerts when flight constraints may not be satisfied by the current flight of the aircraft 104. In other embodiments, the computing device 102 may be implemented using a computer system onboard the aircraft 104, which is configured to determine and present such emergency alerts.

The aircraft 104 may be any aviation vehicle for which flight constraints and alerts associated with non-compliance with flight constraints are relevant and applicable during completion of a flight route. The aircraft 104 may be implemented as an airplane, helicopter, spacecraft, hovercraft, or the like. The one or more avionics systems 106 may include a Flight Management System (FMS), crew alerting system (CAS) devices, automatic terminal information system (ATIS) devices, Automatic Dependent Surveillance-Broadcast (ADS-B), Controller Pilot Data Link Communication (CPDLC), navigation devices, weather radar, aircraft traffic data, and the like. Data obtained from the one or more avionics systems 106 may include, without limitation: an approved flight plan, an estimated time of arrival, instructions from air traffic control (ATC), Automatic Terminal Information Service (ATIS) data, flight plan restriction data, onboard equipment failure data, aircraft traffic data, weather data, or the like.

The server system 114 may include any number of application servers, and each server may be implemented using any suitable computer. In some embodiments, the server system 114 includes one or more dedicated computers. In some embodiments, the server system 114 includes one or more computers carrying out other functionality in addition to server operations. The server system 114 may store and provide any type of data used to determine compliance and/or non-compliance with constraints associated with the current flight. Such data may include, without limitation: flight plan data, flight plan constraint data, and other data compatible with the computing device 102.

The computing device 102 is usually located onboard the aircraft 104, and the computing device 102 communicates with the server system 114 and air traffic control 112 via a wireless communication connection. The computing device 102 and the server system 114 are generally disparately located, and the computing device 102 and air traffic control 112 are generally disparately located. The computing device 102 communicates with the server system 114 and air traffic control 112 via the data communication network 110 and/or via communication mechanisms onboard the aircraft 104.

The data communication network 110 may be any digital or other communications network capable of transmitting messages or data between devices, systems, or components. In certain embodiments, the data communication network 110 includes a packet switched network that facilitates packet-based data communication, addressing, and data routing. The packet switched network could be, for example, a wide area network, the Internet, or the like. In various embodiments, the data communication network 110 includes any number of public or private data connections, links or network connections supporting any number of communications protocols. The data communication network 110 may include the Internet, for example, or any other network based upon TCP/IP or other conventional protocols. In various embodiments, the data communication network 110 could also incorporate a wireless and/or wired telephone network, such as a cellular communications network for communicating with mobile phones, personal digital assistants, and/or the like. The data communication network 110 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

Figure 2:
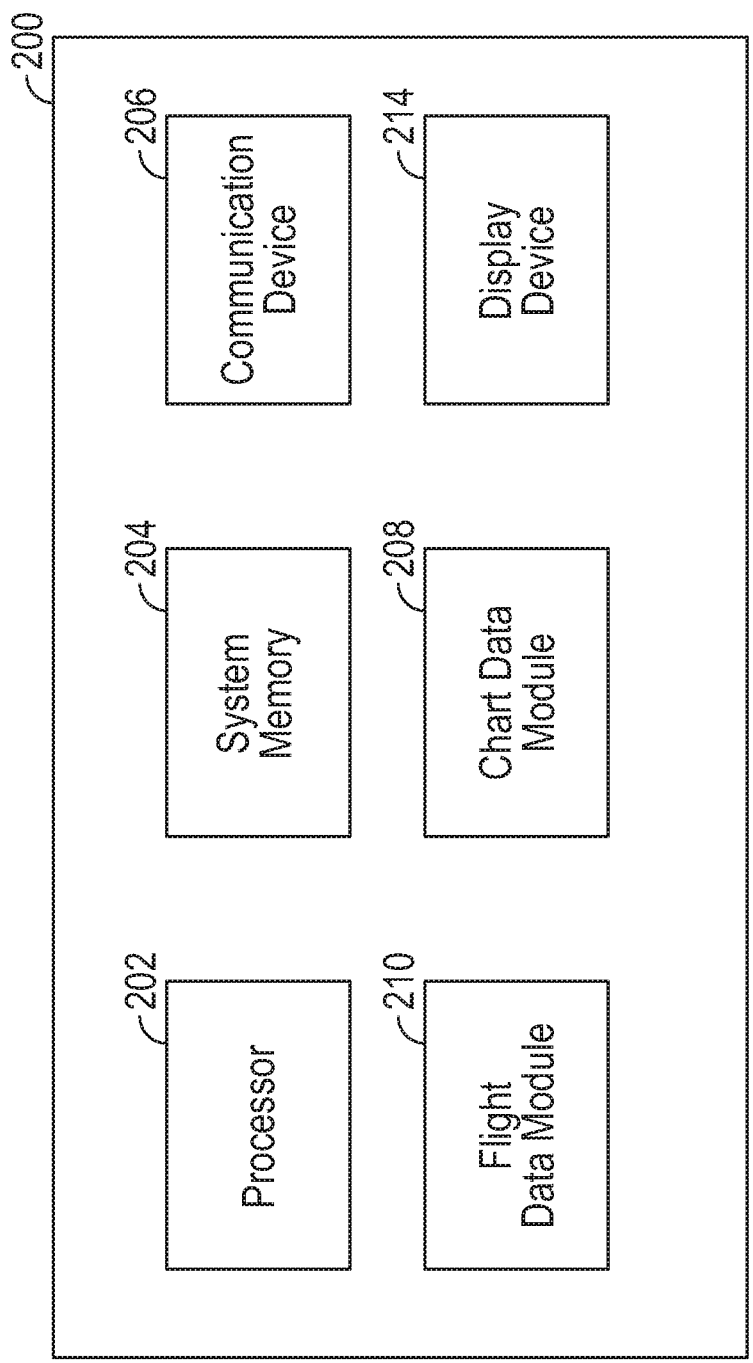
FIG. 2 is a functional block diagram of a computing device for engaging a VNAV/DES mode for an aircraft in accordance with one embodiment

FIG. 2 is a functional block diagram of a computing device 200, in accordance with the disclosed embodiments. It should be noted that the computing device 200 can be implemented with the computing device 102 depicted in FIG. 1. In this regard, the computing device 200 shows certain elements and components of the computing device 102 in more detail.

The computing device 200 generally includes, without limitation: at least one processor 202; system memory 204; a communication device 206; a chart data module 208; a flight data module 210; and a display device 214. These elements and features of the computing device 200 may be operatively associated with one another, coupled to one another, or otherwise configured to cooperate with one another as needed to support the desired functionality as described herein. For ease of illustration and clarity, the various physical, electrical, and logical couplings and interconnections for these elements and features are not depicted in FIG. 2. Moreover, it should be appreciated that embodiments of the computing device 200 will include other elements, modules, and features that cooperate to support the desired functionality. For simplicity, FIG. 2 only depicts certain elements that relate to the emergency alert-generating techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 is communicatively coupled to the system memory 204. The system memory 204 is configured to store any obtained or generated data associated with emergency alerts related to potential non-compliance with flight constraints, including chart data, flight parameters associated with a current flight plan and operation of the aircraft during flight, and the like. The system memory 204 may be realized using any number of devices, components, or modules, as appropriate to the embodiment. Moreover, the computing device 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computing device 200. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The communication device 206 is suitably configured to communicate data between the computing device 200 and one or more remote servers, one or more avionics systems onboard an aircraft, and air traffic control and/or ground control. The communication device 206 may transmit and receive communications over a wireless local area network (WLAN), the Internet, a satellite uplink/downlink, a cellular network, a broadband network, a wide area network, a radio communication network, or the like. As described in more detail below, data received by the communication device 206 may include, without limitation: an approved flight plan, an estimated time of arrival, Automatic Terminal Information Service (ATIS) data, flight plan restriction data, onboard equipment failure data, and other data compatible with the computing device 200. Data provided by the communication device 206 may include, without limitation, radio communications and/or downlink communications transmitted to air traffic control (ATC), and the like.

The chart data module 208 is configured to identify and extract constraints noted in the electronic charts for a current flight plan. A flight constraint is a restriction for performing action items applicable to the current flight, effectively limiting the performance of one or more action items to circumstances in which a particular condition exists. Examples of constraints may include, but are not limited to, restricting the performance of landing procedures (i.e., action items) to daytime hours (i.e., a condition) and/or to circumstances during which local weather data is available (i.e., a condition) or a destination airport tower is operational (i.e., a condition).

The flight data module 210 is configured to obtain flight data parameters from one or more avionics devices onboard the aircraft and/or from one or more remote servers or other external sources (via the communication device 206). Flight data parameters may include, without limitation: an approved flight plan, an estimated time of arrival, Automatic Terminal Information Service (ATIS) data, flight plan restriction data, onboard equipment failure data, or the like.

In practice, the chart data module 208 and the flight data module 210 may be implemented with (or cooperate with) the at least one processor 202 to perform at least some of the functions and operations described in more detail herein. In this regard, the chart data module 208 and the flight data module 210 may be realized as suitably written processing logic, application program code, or the like.

The display device 214 is configured to display various icons, text, and/or graphical elements for emergency alerts associated with potential non-compliance with flight constraints, or the like. In an exemplary embodiment, the display device 214 is communicatively coupled to the at least one processor 202. The at least one processor 202 and the display device 214 are cooperatively configured to display, render, or otherwise convey one or more graphical representations or images associated with emergency alerts on the display device 214, as described in greater detail below. In an exemplary embodiment, the display device 214 is realized as an electronic display configured to graphically display emergency alerts, as described herein. In some embodiments, the computing device 200 is an integrated computer system onboard an aircraft, and the display device 214 is located within a cockpit of the aircraft and is thus implemented as an aircraft display. In other embodiments, the display device 214 is implemented as a display screen of a standalone, personal computing device (e.g., laptop computer, tablet computer). It will be appreciated that although the display device 214 may be implemented using a single display, certain embodiments may use additional displays (i.e., a plurality of displays) to accomplish the functionality of the display device 214 described herein.

In aircraft operations, a "flight descent profile" is a plan by which an aircraft approaches its destination airport prior to landing. A descent profile may also be known as a continuous descent approach (CDA). The descent profile is used to optimize an aircraft approach by reducing fuel consumption and noise compared to other conventional descents. In typical operations, an aircraft may approach an airport under manual control in a "stairstep" fashion, which involves descending to a certain altitude and then requesting permission before descending further. In contrast, an optimized flight descent profile allows for smoother descents with fewer changes to the FPA of the aircraft. The flight descent profile is often locally controlled and dictated by the air traffic control (ATC) at the destination airport. It is typically part of a predetermined flight plan that is loaded and stored on board the aircraft in an FMS.

Manually controlling a descent profile is often inefficient and wasteful of both fuel and time. The aircraft may get off track from its preplanned flight descent profile. Once off track, the aircrew may have difficulty re-engaging the descent profile without violating altitude or speed restrictions. For example, when the aircraft is above the ideal descent profile, a speed break is often used to increase the descent rate and descent angle in order to regain the ideal profile while slowing the airspeed. This has a negative impact on optimal fuel usage of the aircraft.

A key feature for automating a vertical navigation descent profile is the FMS of the aircraft. An FMS is a specialized computer that automates a variety of in-flight tasks such as in-flight management of the flight plan. Using various sensors such as a global positioning system (GPS), the FMS determines the aircraft's position and guides the aircraft along its flight plan using its navigation database. From the cockpit, the FMS is normally controlled through a visual display device such as a control display unit (CDU) which incorporates a small screen, a keyboard or a touchscreen. The FMS displays the flight plan and other critical flight data to the aircrew during operation.

The FMS may have a built-in electronic memory system that contains a navigational database. The navigational database contains elements used for constructing a flight plan. In some embodiments, the navigational database may be separate from the FMS and located onboard the aircraft while in other embodiments the navigational database may be located on the ground and relevant data provided to the FMS via a communications link with a ground station. The navigational database used by the FMS may typically include: waypoints/intersections; airways; radio navigation aids/navigational beacons; airports; runway; standard instrument departure (SID) information; standard terminal arrival (STAR) information; holding patterns; and instrument approach procedures. Additionally, other waypoints may also be manually defined by pilots along the route.

The flight plan is generally determined on the ground before departure by either the pilot or a dispatcher for the owner of the aircraft. It may be manually entered into the FMS or selected from a library of common routes. In other embodiments the flight plan may be loaded via a communications data link from an airline dispatch center. During preflight planning, additional relevant aircraft performance data may be entered including information such as: gross aircraft weight; fuel weight and the center of gravity of the aircraft. The aircrew may use the FMS to modify the plight flight plan before takeoff or even while in flight for variety of reasons. Such changes may be entered via the CDU. Once in flight, the principal task of the FMS is to accurately monitor the aircraft's position. This may use a GPS, a VHF omnidirectional range (VOR) system, or other similar sensor in order to determine and validate the aircraft's exact position. The FMS constantly cross checks among various sensors to determine the aircraft's position with accuracy.

In typical operations, the FMS is used to compute a VNAV profile for a descent path of an aircraft. Additionally, the FMS may be used to perform advanced VNAV functions. The purpose of VNAV is to predict and optimize the vertical path of the aircraft. The FMS provides guidance that includes control of the pitch axis and of the throttle of the aircraft. In order to accomplish these task, the FMS has detailed flight and engine model data of the aircraft. Using this information, the FMS may build a predicted vertical descent path for the aircraft. A correct and accurate implementation of VNAV has significant advantages in fuel savings and on-time efficiency.

The first thing the VNAV/DES system of the FMS calculates for the descent profile is the top of descent point (TOD). This is the point where an efficient and comfortable descent begins. Normally this will involve an idle descent, but for some aircraft an idle descent is too steep and uncomfortable. The FMS calculates the TOD by "flying" the descent backwards from touchdown through the approach and up to cruising altitude. It does this using the flight plan, the aircraft flight model and descent winds. For an advanced FMS, this is a very sophisticated and accurate prediction, for simple FMS (on smaller aircraft) it can be determined by a "rule of thumb" such as a 3° descent path.

From the TOD, the VNAV determines a four-dimensional predicted path. As the VNAV commands the throttles to idle, the aircraft begins its descent along the VNAV path. If either the predicted path is incorrect or the down path winds differ from the predictions, then the aircraft will not perfectly follow the path. As a result, the aircraft will vary the pitch in order to maintain the path. Since the throttles are at idle, this will modulate the speed. Normally, the FMS allows the speed to vary within a small band. After this, either the throttles advance (if the aircraft is below path) or the FMS requests speed brakes with a message such as "ADD DRAG" (if the aircraft is above path).

An ideal idle descent, also known as a "green descent" uses the minimum fuel, minimizes pollution (both at high altitude and local to the airport) and minimizes local noise. While most modern FMS of large airliners are capable of idle descents, most ATC systems cannot handle multiple aircraft each using its own optimum descent path to the airport, at this time thus the use of idle descents is coordinated by ATC.

Additionally, aircrew confidence when engaging the FMS in VNAV/DES mode may be problematic. The aircrew must have confidence that they will accurately intercept the descent profile prior to violating any altitude constraints. Also, the aircrew needs to be alerted that the VNAV will automatically engage once reaching the intercept point. Finally, the crew will need aircraft performance data and notification for when and where the intercept point will occur.

Figure 3:
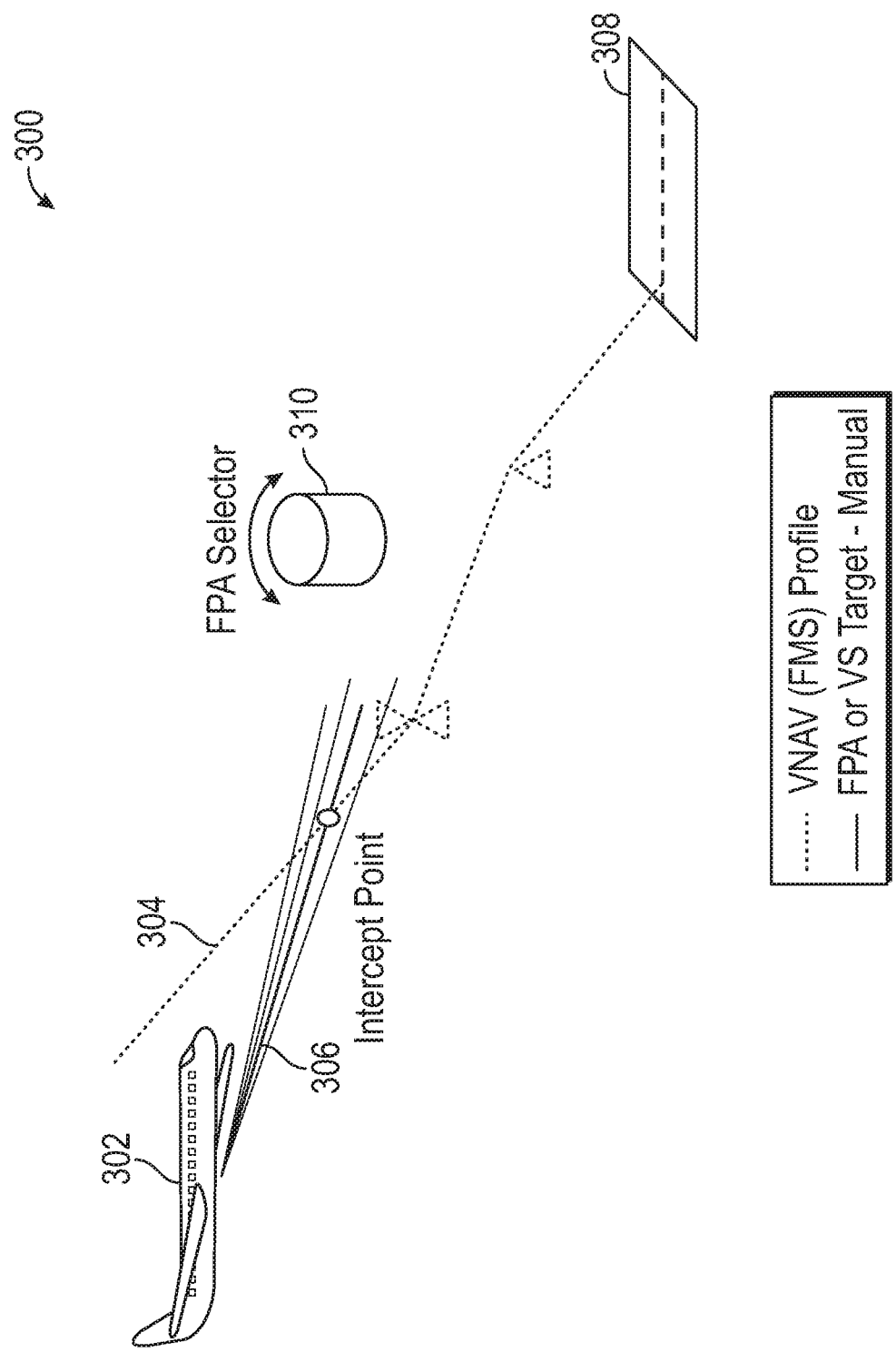
FIG. 3 shows a diagram of a manually controlled vertical navigation path of an aircraft in accordance with one embodiment.

Turning now to FIG. 3, a diagram 300 of a manually controlled vertical navigation path of an aircraft is shown in accordance with one embodiment. In this embodiment, the aircraft 302 is presently off track from a pre-plotted VNAV 304 that is stored in the FMS on board the aircraft 302. In some embodiments, the pre-set VNAV is computed by the FMS as well as stored in the FMS. The aircrew is maintaining a manual intercept path 306 that relies upon manual control 310 of both the FPA and the VS of the aircraft. The manual intercept path 306 may vary in both FPA and VS according to adjustments made by the aircrew. The manual intercept path 306 typically is inefficient both in time and fuel consumption and may result in flight delays in reaching the ultimate destination 308 of the aircraft.

Figure 4:
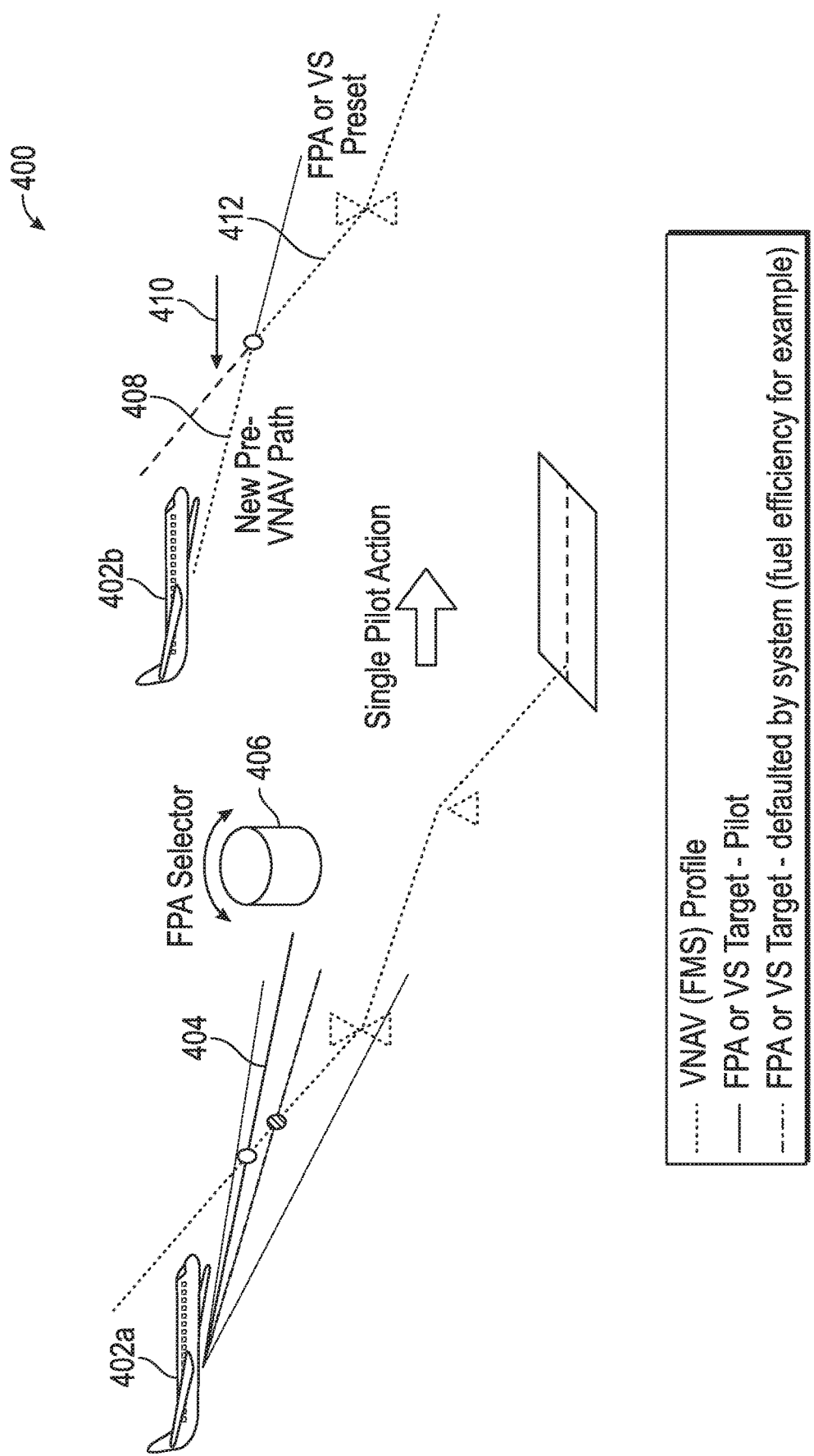
FIG. 4 shows comparison diagrams of engaging an automatically controlled vertical navigation path of an aircraft in accordance with one embodiment.

Turning now to FIG. 4, a pair of diagrams 400 is shown comparing a manually controlled vertical navigation path with an automated pre-VNAV path in accordance with one embodiment. As previously shown in FIG. 3, an aircraft 402a is shown utilizing a manually selected 406 interception path 404 for the VNAV profile. In comparison, the aircraft 402b engages, through a "single pilot action" with the FMS, an embodiment that determines a pre-VNAV 408 engagement path that intercepts the descent profile 424. The single pilot action involves simply accepting the default intercept parameters proposed to the aircrew by the FMS in VNAV/DES mode. Once these parameters are accepted, the FMS will construct a new path segment (called a "pre-VNAV") that replaces the previous VNAV path 410 based on the selected FPA and VS target of the aircraft.

Once the new pre-VNAV path segment is constructed, the aircrew is shown a visualization and prediction of the pre-VNAV path on a visual display device of the FMS and thereby enhancing pilot awareness. The new pre-VNAV path segment based on the selected VPA or VS target allows immediate VNAV/DES engagement and tight control of the aircraft along the pre-VNAV engagement path. In other embodiments, a default FPA or VS target may be proposed to the crew and the crew can then modify these targets as desired instead of accepting the default targets.

Figure 5:
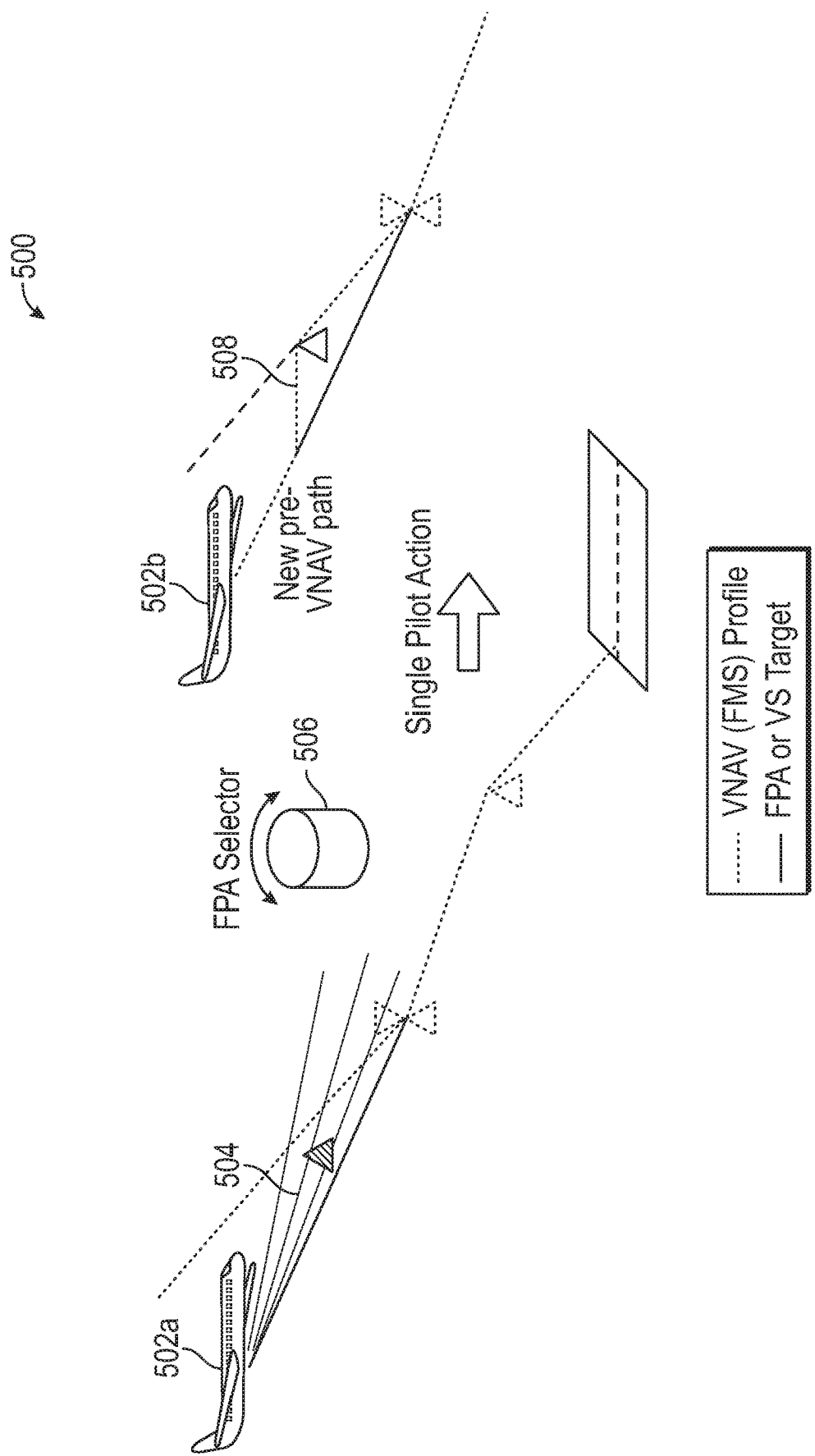
FIG. 5 shows comparison diagrams of engaging an automatically controlled vertical navigation path of an aircraft in accordance with one embodiment.

Turning now to FIG. 5, another pair of diagrams 500 is shown comparing a manually controlled vertical navigation path with an automated pre-VNAV path in accordance with one embodiment. As previously shown in FIG. 3, an aircraft 502*a* is shown utilizing a manually selected 506 intercept path 504 for the VNAV profile. In comparison, the aircraft 502*b* is shown with a newly constructed pre-VNAV path as previously described in FIG. 4. However, this pre-VNAV path includes a level flight segment 508 for the aircraft during the flight to intercept the preset VNAV profile. This embodiment demonstrates that the FMS in VNAV/DES mode will notify the aircrew with an alert to the presence of a level flight segment thus enhancing pilot awareness of the aircraft's performance parameters during the pre-VNAV path.

Figure 6A:
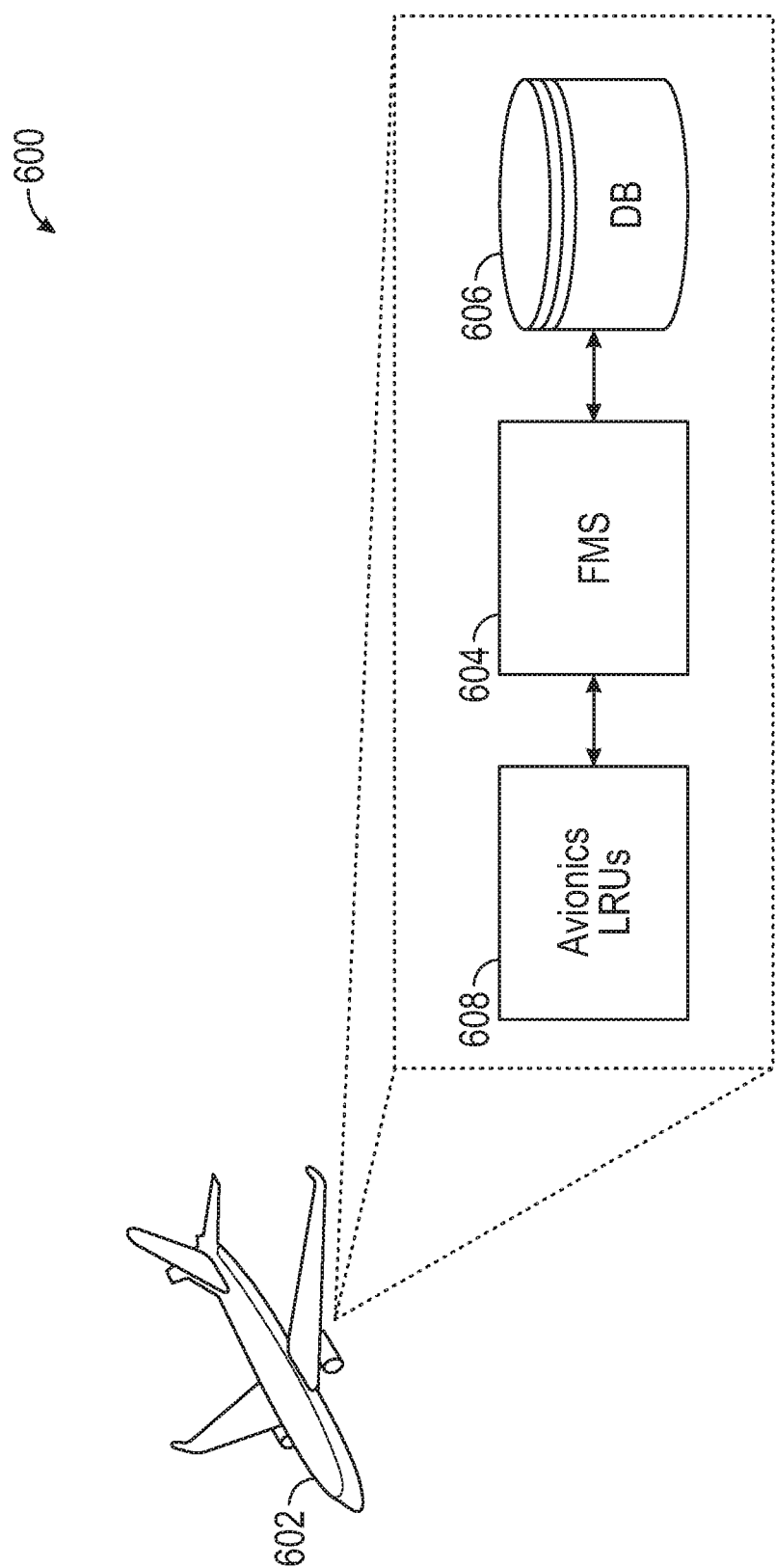
FIG. 6a shows a diagram of a flight management system (FMS) and a supporting database on board an aircraft in accordance with one embodiment.

Turning now to FIG. 6*a*, a diagram 600 is shown of an in-flight aircraft 602 that contains an onboard FMS 604 along with a database 606 that is accessed by the FMS 604 in accordance with one embodiment. In alternative embodiments, the database 606 may be integrated as part of the FMS 604. In still other embodiments, the database 606 may be located off board the aircraft on the ground and connected to the FMS 604 via a communications data link. In some embodiments, the database 606 may include a navigation database as well as performance characteristics database of the aircraft 602 for retrieval and use by the FMS 604.

In some embodiments, the aircraft 602 that contains an onboard FMS 604 along with a database 606 and avionics line-replaceable units (LRUs) 608 that are accessed by the FMS 604 in accordance with one embodiment. In alternative embodiments, the database 606 may be integrated as part of the FMS 604. In still other embodiments, the database 606 may be located off board the aircraft on the ground and connected to the FMS 604 via a communications data link. In some embodiments, the database 606 may include a navigation database as well as performance characteristics database of the aircraft 602 for retrieval and use by the FMS 604. In present embodiments, the FMS along with a navigational database are used to store the flight plan as well as the automatic and manual reporting waypoints along the flight path.

In exemplary embodiments, an existing FMS onboard an aircraft is utilized to communicate data between existing onboard avionics systems or line-replaceable units (LRUs) which supports or otherwise performs a flight management functionality. In this regard, the FMS is configured to receive operational or status data from one or more avionics systems or LRUs onboard the aircraft at corresponding avionics interfaces and convert one or more characteristics of the operational data to support communicating the operational data with the FMS. For purposes of explanation, the subject matter may primarily be described herein in the context of converting operational data received from onboard avionics or LRUs in a first format (e.g., an avionics bus format) into another format supported by the interface with the FMS, the subject matter described herein is not necessarily limited to format conversions or digital reformatting, and may be implemented in an equivalent manner for converting between other data characteristics, such as, for example, different data rates, throughputs or bandwidths, different sampling rates, different resolutions, different data compression ratios, and the like.

The avionics LRUs generally represent the electronic components or modules installed onboard the aircraft that support navigation, flight planning, and other aircraft control functions in a conventional manner and/or provide real-time data and/or information regarding the operational status of the aircraft to the FMS. For example, practical embodiments of the aircraft system will likely include one or more of the following avionics LRUs suitably configured to support operation of the aircraft: a weather system, an air traffic management system, a radar system, a traffic avoidance system, an autopilot system, an autothrottle (or autothrust) system, hydraulic systems, pneumatics systems, environmental systems, electrical systems, engine systems, trim systems, lighting systems, crew alerting systems, electronic checklist systems, and/or another suitable avionics system.

In exemplary embodiments, the avionics interfaces are realized as different ports, terminals, channels, connectors, or the like associated with the FMS that are connected to different avionics LRUs via different wiring, cabling, buses, or the like. In this regard, the interfaces may be configured to support different communications protocols or different data formats corresponding to the respective type of avionics LRU that is connected to a particular interface. For example, the FMS may communicate navigation data from a navigation system via a navigation interface coupled to a data bus supporting the ARINC 424 (or A424) standard, the ARINC 629 (or A629) standard, the ARINC 422 (or A422) standard, or the like. As another example, a datalink system or other communications LRU may utilize an ARINC 619 (or A619) compatible avionics bus interface for communicating datalink communications or other communications data with the FMS.

Figure 6B:
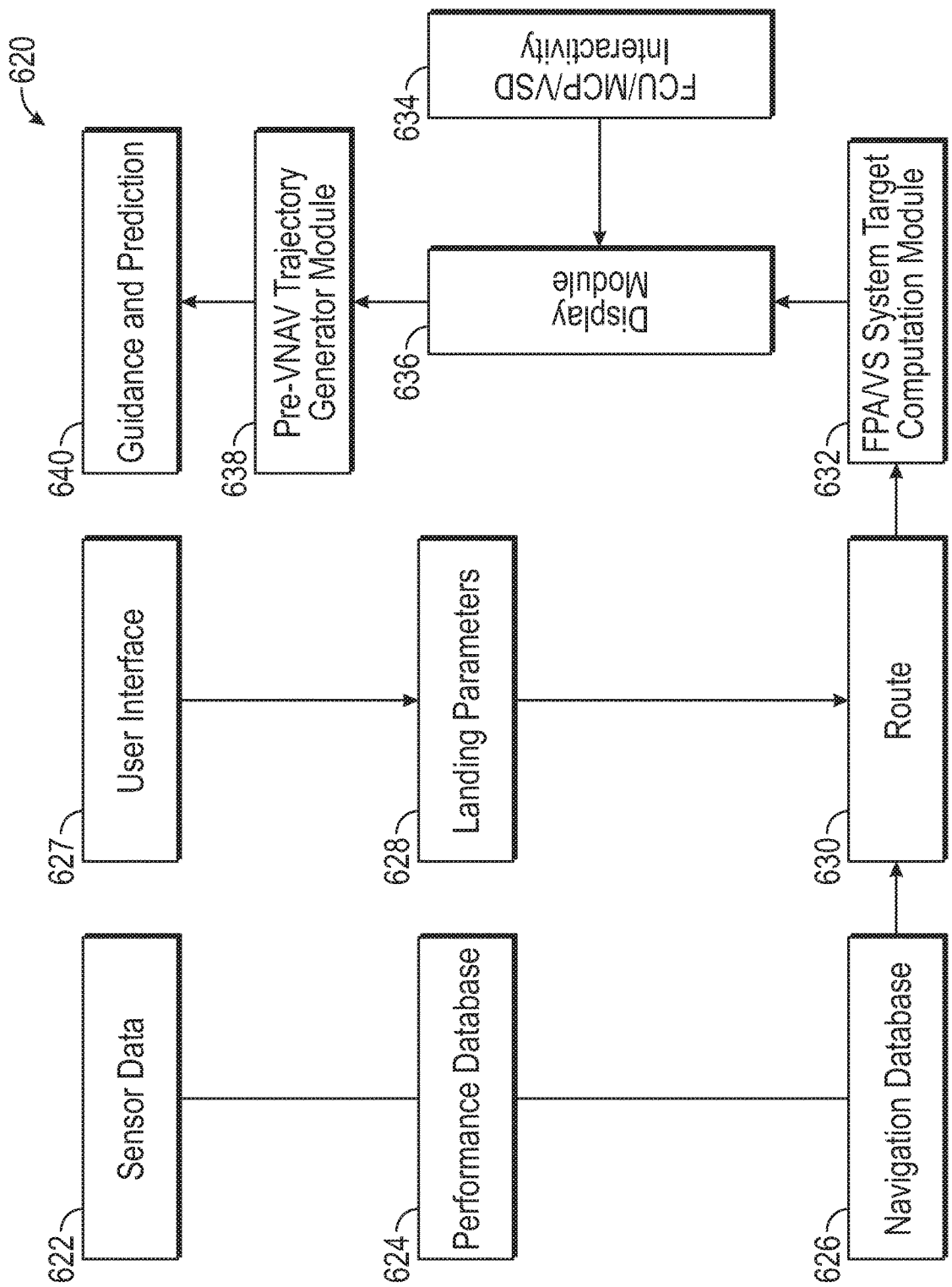
FIG. 6b shows a block diagram of a components for a system for controlling a descent mode of an aircraft in accordance with one embodiment.

Turning now to FIG. 6*b*, a block diagram 620 is shown of various components of the FMS in accordance with one embodiment. In the embodiment shown, sensor data 622 is collected from avionics LRUs to determine such things as location, direction, speed and orientation of the aircraft. The sensor data along with performance data 624 for the aircraft are retrieved from a performance database along with data from a navigation database 626 and processed against the predetermined flight route 630 of the aircraft. An aircrew member uses a user interface 627 to load the landing parameters 628 for the aircraft. All of this data and input from the aircrew is then sent to the FPA/VS System Target Computation Module 632 for the calculation of intercept parameters for the aircraft to intercept the VNAV profile. The intercept parameters are displayed on the visual display module 636. The aircrew is allowed to view and manually select or change parameters with FCU interactivity 634. Once the aircrew member has accepted the parameters on the display module, the pre-VNAV Trajectory Generator Module 638 generates the pre-VNAV path and displays the guidance and prediction 640 to the aircrew for intercept of the VNAV.

Figure 7:
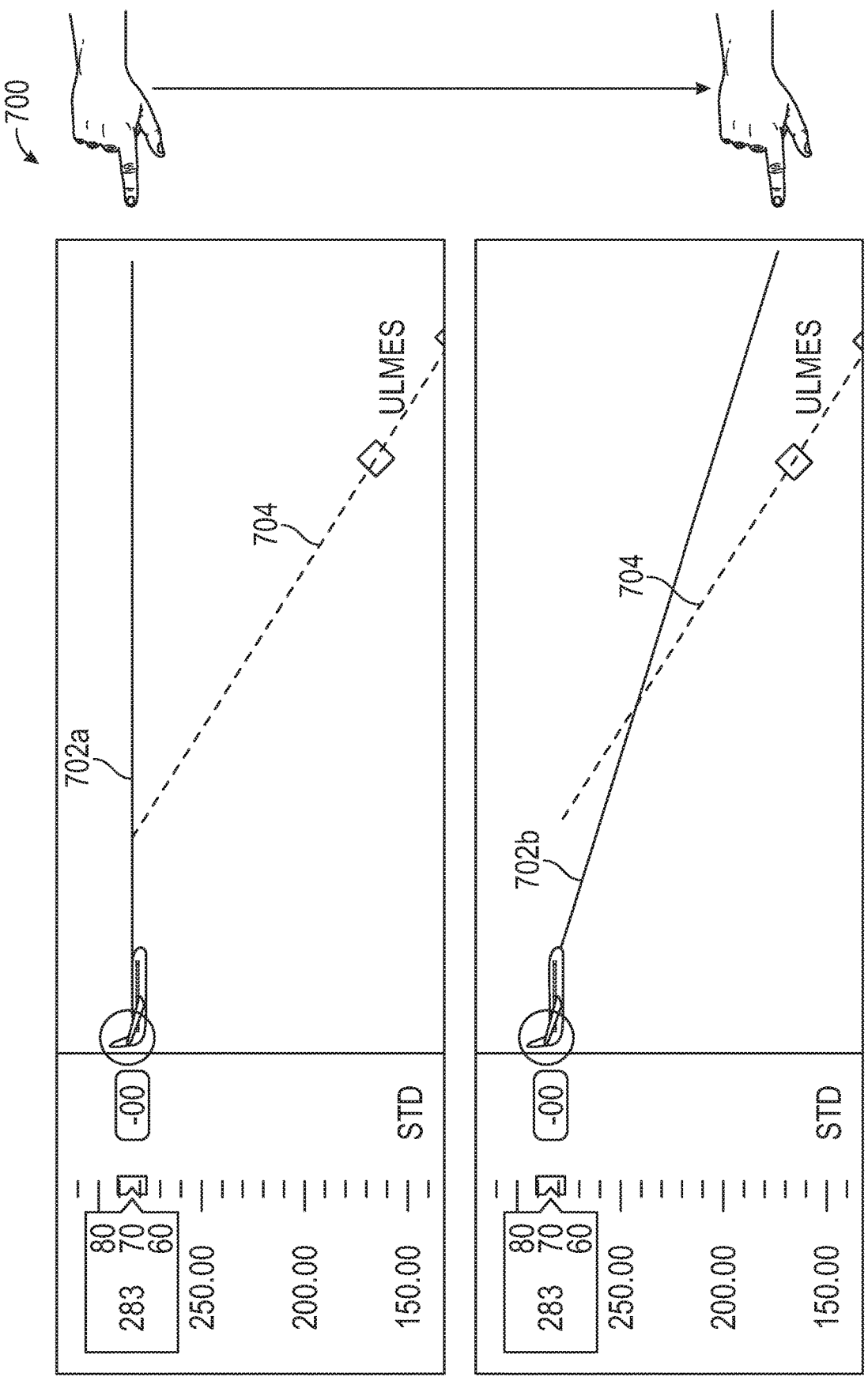
FIG. 7 shows an example of a touchscreen display for adjusting a descent mode of an aircraft in accordance with one embodiment.

Turning now to FIG. 7, an example of a touchscreen display 700 is shown for adjusting a descent mode of an aircraft in accordance with one embodiment. In this example the CDU of the FMS is shown as a touchscreen that allows an aircrew member to manually select the intercept point for the VNAV profile. The aircrew member simply touches the present flight path of the aircraft 702a and drags it to the designated intercept point along the VNAV 704. Once this is complete, the system establishes a new intercept point 702b along the VNAV and automatically calculates the intercept parameters based on the current FPA and VS of the aircraft.

Figure 8:
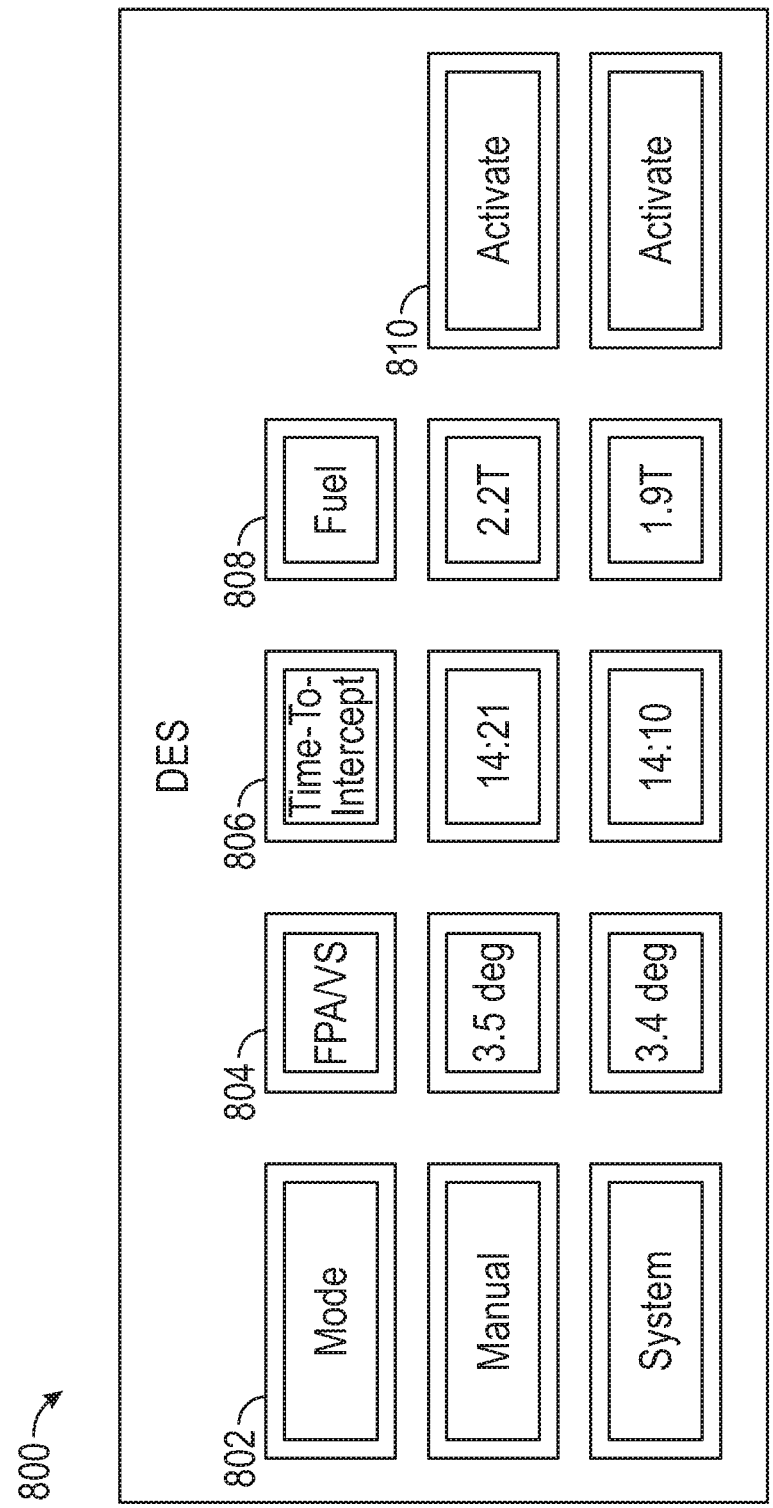
FIG. 8 shows an example of a display of parameters for a descent mode of an aircraft in accordance with one embodiment.

Turning now to FIG. 8, an example of a display of parameters 800 for a descent mode (DES) of an aircraft in accordance with one embodiment. In this example the CDU of the FMS is shown as a touchscreen that allows an aircrew member to review and to manually select the VNAV/DES mode with a single action. The display of parameters 800 shows various flight efficiency parameters such as fuel savings and time-to-intercept data. In alternative embodiments, aircraft performance parameters could be shown to include things such as deceleration rate. In the embodiment shown, a "mode" 802 is shown as being either "manual" mode where the aircraft is under control of the pilot or a "system" mode where the aircraft is under control of the FMS. The FPA/VS parameter 804 is shown with values of 3.5° FPA for the manual mode and 3.4° FPA for the system mode. The display shows a "time-to-intercept" parameter 806 with a value of 14:21 for the manual mode and a value of 14:10 for the system mode. The display shows a "fuel" parameter 808 with a value of 2.2 for the manual mode along with a value of 1.9 for the system mode. The display has a separate "ACTIVATE" button 810 for the manual and the system modes respectively. This allows the aircrew member to select either the manual or system mode with a single action after reviewing the appropriate displayed parameters.

Figure 9:
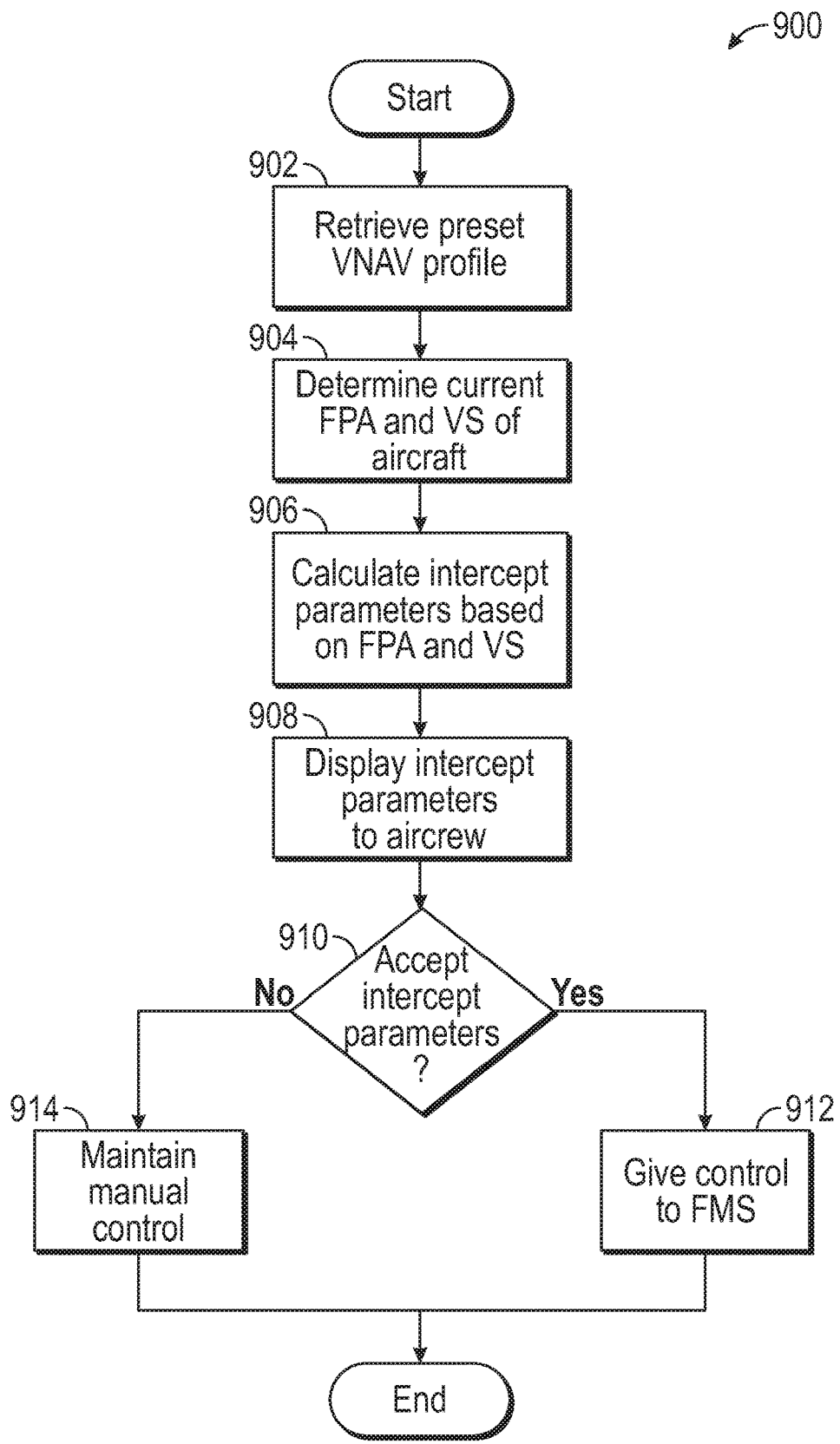
FIG. 9 shows a flowchart depicting a method for controlling an aircraft along a vertical navigation path in accordance with one embodiment.

Turning now to FIG. 9, a flowchart 900 is shown depicting a method for controlling an aircraft along a vertical navigation path in accordance with one embodiment. First, the preset VNAV profile for the descent path of the aircraft is retrieved from the FMS 902. Next, the current FPA and VS of the aircraft is determined 904 and intercept parameters are calculated based on this data 906. The intercept parameters are displayed to the aircrew 908 with a request to either accept the parameters 910 and give control to the FMS 912 or reject the parameters and maintain manual control 914 of the intercept flight path to the VNAV.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for planning a vertical navigational descent (VNAV/DES) mode of a flight management system (FMS) for an aircraft during pre-flight planning, the method comprising:
retrieving a preset vertical navigation (VNAV) profile for a descent path of the aircraft as part of the pre-flight planning, where the preset VNAV profile is stored in the FMS;
determining a current flight path angle (FPA) and vertical speed (VS) of the aircraft;
selecting an intercept point for the preset VNAV profile, where the intercept point is manually selected by an aircrew member;
calculating intercept parameters and constructing a pre-VNAV path for the aircraft to intercept the preset VNAV profile at the selected intercept point with the VNAV/DES mode of the FMS, where the intercept parameters are calculated based on the current FPA and VS;
displaying the intercept parameters to the aircrew member of the aircraft on a visual display device; and
allowing the aircrew member to accept the intercept parameters for the aircraft to intercept the preset VNAV profile with the VNAV/DES mode of the FMS as part of the pre-flight planning.

2. The method of claim 1, where the aircrew member selects the intercept point with a graphical display touchscreen.

3. The method of claim 1, further comprising:
notifying the aircrew member of a level flight segment for the aircraft to intercept the preset VNAV profile.

4. The method of claim 1, where the intercept parameters displayed to the aircrew member on the visual display device include a default FPA for calculating the intercept parameters.

5. The method of claim 1, where the intercept parameters displayed to the aircrew member on the visual display device include a VS target.

6. The method of claim 1, where the intercept parameters displayed to the aircrew member on the visual display device include flight efficiency parameters.

7. The method of claim 6, where the flight efficiency parameters include fuel savings while using the VNAV/DES mode of the FMS.

8. The method of claim 6, where the flight efficiency parameters include time-to-intercept data.

9. The method of claim 1, where the intercept parameters displayed to the aircrew member on the visual display device include aircraft performance parameters during the intercept of the preset VNAV profile.

10. The method of claim 9, where the aircraft performance parameters include deceleration parameters.

11. The method of claim 1, where the aircrew member manually accepts the intercept parameters for the aircraft to intercept the preset VNAV profile with a single input action.

12. A system for planning a vertical navigational descent (VNAV/DES) mode for an aircraft during pre-flight planning, comprising:
a retrievable electronic memory located onboard the aircraft, where the retrievable electronic memory stores a preset vertical navigation (VNAV) profile for a descent path of the aircraft; and
a flight management system (FMS) on board the aircraft, where the FMS
activates the vertical navigational descent (VNAV/DES) mode,
retrieves the preset vertical navigation (VNAV) profile for a descent path of the aircraft stored in the retrievable electronic memory as part of the pre-flight planning,
determines a current flight path angle (FPA) and vertical speed (VS) of the aircraft,
receives an intercept point for the preset VNAV profile, where the intercept point is manually selected by an aircrew member,
calculates intercept parameters and constructs a pre-VNAV path for the aircraft to intercept the preset VNAV profile at the selected intercept point with the VNAV/DES mode of the FMS, where the intercept parameters are calculated based on the current FPA and VS,
displays the intercept parameters to the aircrew member of the aircraft on a visual display device, and
allows the aircrew member to accept the intercept parameters for the aircraft to intercept the preset VNAV profile with the VNAV/DES mode of the FMS as part of the pre-flight planning.

13. The system of claim 12, where the FMS notifies the aircrew member of a level flight segment for the aircraft to intercept the preset VNAV profile.

14. The system of claim 12, where the intercept parameters displayed to the aircrew member on the visual display device include flight efficiency parameters during the intercept of the preset VNAV profile.

15. The system of claim 14, where the flight efficiency parameters include fuel savings while using the VNAV/DES mode of the FMS.

16. The system of claim 14, where the flight efficiency parameters include time-to-intercept data.

17. The system of claim 12, where the preset VNAV profile is computed by the FMS.

* * * * *